United States Patent [19]

Seto et al.

[11] Patent Number: 5,036,657

[45] Date of Patent: Aug. 6, 1991

[54] DUAL MANIFOLD FUEL SYSTEM

[75] Inventors: Stanford P. T. Seto, Loveland; Richard E. Stenger, Cincinnati, both of Ohio

[73] Assignee: General Electric Company, Cincinnati, Ohio

[21] Appl. No.: 424,037

[22] Filed: Oct. 19, 1989

Related U.S. Application Data

[62] Division of Ser. No. 66,300, Jun. 25, 1987, Pat. No. 4,903,478.

[51] Int. Cl.⁵ .............................................. F02C 9/28
[52] U.S. Cl. ................................. 60/39.281; 60/739; 60/746
[58] Field of Search ............... 60/39.281, 733, 739, 60/746, 747, 734, 39.826, 39.141

[56] References Cited

U.S. PATENT DOCUMENTS

| | | | |
|---|---|---|---|
| 2,617,478 | 11/1952 | Hildestad | 60/39.281 |
| 2,846,845 | 8/1958 | Parker | 60/39.094 |
| 2,927,425 | 3/1960 | Werts | 60/39.281 |
| 2,951,341 | 9/1960 | Henning, Jr. et al. | 60/739 |
| 3,056,259 | 10/1962 | Jebb et al. | 60/39.141 |
| 3,158,998 | 12/1964 | Robinson et al. | 60/739 |
| 3,468,333 | 9/1969 | Skinner | 60/39.141 |
| 3,698,186 | 10/1972 | Beane et al. | 60/749 |
| 3,925,002 | 12/1975 | Verdouu | 60/746 |
| 4,027,473 | 6/1977 | Baker | 60/39.281 |
| 4,062,183 | 12/1977 | Davies et al. | 60/39.094 |
| 4,305,255 | 2/1981 | Davies et al. | 60/741 |
| 4,312,185 | 1/1982 | Nash et al. | 60/739 |
| 4,313,167 | 1/1982 | Brown | 60/223 |
| 4,337,616 | 7/1982 | Downing | 60/742 |
| 4,499,735 | 2/1985 | Moore et al. | 60/739 |
| 4,541,237 | 9/1985 | Dickey | 60/39.281 |
| 4,603,548 | 8/1986 | Ishibashi et al. | 60/746 |
| 4,716,719 | 1/1988 | Takahishi et al. | 60/39.821 |

FOREIGN PATENT DOCUMENTS

| | | |
|---|---|---|
| 132729 | 6/1986 | Japan .................. 60/739 |
| 577062 | 5/1946 | United Kingdom . |
| 1504348 | 3/1978 | United Kingdom . |
| 2041085 | 9/1980 | United Kingdom . |
| 2125110 | 2/1984 | United Kingdom . |

Primary Examiner—Louis J. Casaregola
Assistant Examiner—Timothy S. Thorpe
Attorney, Agent, or Firm—Jerome C. Squillaro

[57] ABSTRACT

A dual manifold fuel supply system for the combustor of gas generator in a turbofan engine wherein alternating circumferentially aligned fuel injectors are alternately supplied with fuel by a first or second fuel manifold. Fuel flow to both manifolds are controlled by a fuel control, preferably a full authority digital electronic control, and the second manifold has an off valve interposed between it and the fuel control.

7 Claims, 2 Drawing Sheets

DUAL MANIFOLD FUEL SYSTEM

This is a division of application Ser. No. 07/066,300, filed June 25, 1987, now U.S. Pat. No. 4,903,478.

FIELD OF THE INVENTION

The invention relates to fuel supply systems for high efficiency gas turbine engines for aircraft propulsion and particularly to a new and improved fuel injection system wherein a number of the fuel nozzles may be shutoff in response to power requirements of the gas turbine engine.

BACKGROUND OF THE INVENTION

The invention relates to fuel supply systems for high efficiency gas turbine engines for aircraft propulsion and particularly to a new and improved dual fuel manifold system and method for operating same wherein each manifold supplies fuel to a portion of the fuel injectors and one of the manifolds has a cutoff valve between it and the fuel control.

Recent improvements in aircraft jet engine technology with respect to fuel efficiency have been too numerous to mention. Improvements in the various components and systems, such as the compressor, turbine, and controls, have yielded significant reductions in the amount of fuel required during typical flight mission cycles. One effect of the reduced fuel requirements is to lower the combustor operating fuel to air ratio to levels approaching the lean stability limit conventionally know as the blowout limit. The reduced fuel requirement exists during steady-state and transient operating conditions of the engine. Under certain flight conditions such as during idle descent on a cold day, a period during which the aircraft is reducing its cruise altitude, the combustor of the gas generating portion of the jet engine may experience fuel starvation at one or more fuel injectors. The result may be severe enough to exceed the blowout limit thereby totally extinguishing the combustion process and stopping the engine's operation. Further complicating the design and operation of these highly efficient engines are FAA emission requirements, in particular those directed to preventing high levels of invisible emissions at idle on the ground. The inventors have discovered a jet engine fuel supply system and method of operation to prevent the aforementioned blowout from occurring. The invention also allows the construction and safe operation of larger more efficient high bypass ratio turbofan and propfan engines of both the ducted and unducted type engines. The invention also improves the exhaust emissions of high bypass ratio gas turbine engines from a pollution standpoint thereby helping to meet stringent FAA emission requirements.

OBJECTS OF THE INVENTION

In view of the above mentioned problems with present day high bypass ratio turbofan and propfan jet engines it is a primary object of the invention to prevent aircraft gas turbine engines from exceeding their blowout limit during steady state operation.

One object of the invention is to prevent aircraft gas turbine engines from exceeding their blowout limit during transient operating conditions.

Another object of the invention is to prevent aircraft gas turbine engines from exceeding their blowout limit during adverse operating conditions.

Yet another object of the invention is to allow more efficient aircraft gas turbine engines having high bypass ratios to be designed and built.

A further object of the invention is to improve the safety of fuel efficient high bypass ratio gas turbine engines.

SUMMARY OF THE INVENTION

A fuel injection system for use in the combustor section of a gas turbine engine comprising a plurality of fuel nozzles wherein a portion of the fuel nozzles is interruptable in response to a predetermined gas turbine engine parameter or condition. In one form of the invention the engine parameter is the fuel to air ratio and in another form of the invention the engine condition is descent as indicated by the power setting of the gas turbine engine. In another embodiment the invention comprises a first and a second plurality of fuel nozzles which are in fluid supply communication with first and second first fuel manifolds respectively. The manifolds are supplied with fuel by first and second fuel lines, respectively, which in turn are supplied from a fuel control. A shutoff valve is interposed in the first fuel line and is responsive to at least one predetermined gas turbine engine parameter or an engine condition. In yet a further embodiment the valve and fuel control are controlled by a digital electronic computer as described in U.S. Pat. No. 4,137,707.

DETAILED DESCRIPTION OF THE DRAWINGS

Figure 1:
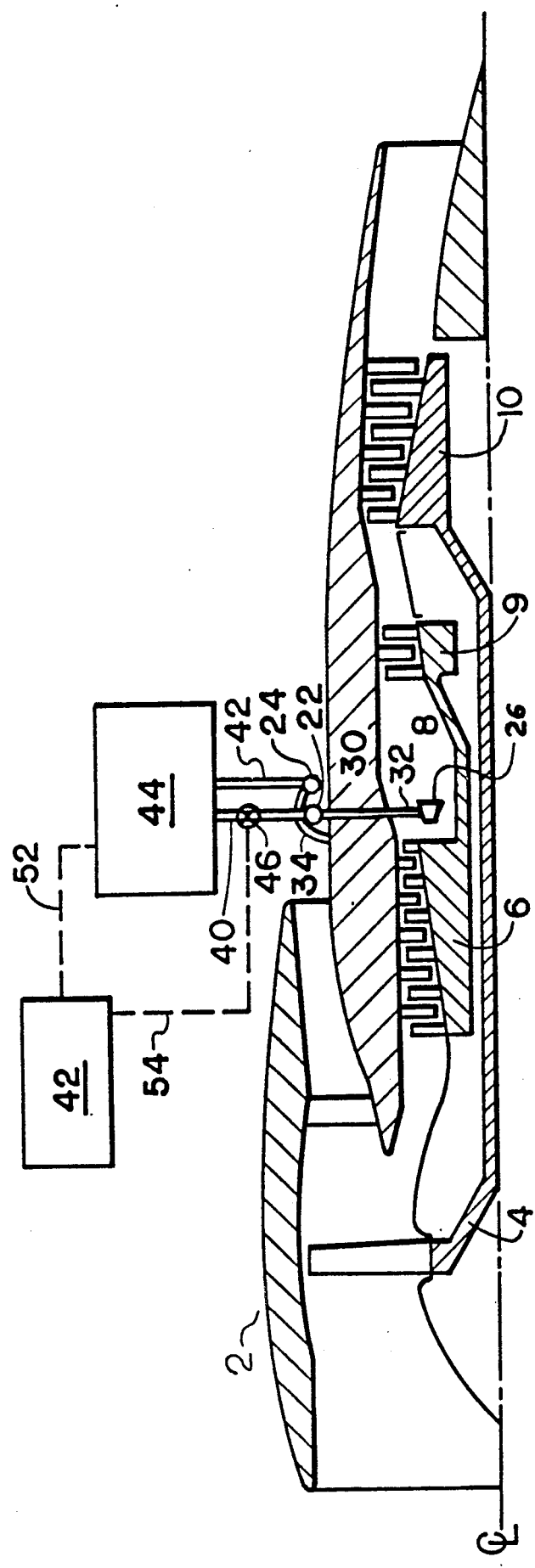
FIG. 1 is a diagrammatic cross section of a gas turbine engine showing a fuel injection system made in accordance with the present invention.

A gas turbine engine 2 of the high bypass type shown in FIG. 1 comprises a fan section 4 a compressor section 6 a combustor section 8 and a turbine section 10. The combustor section 8 burns air and fuel to provide high temperature gases to flow into the turbine which then extracts energy from the high temperature gas. The high turbine 9 powers the compressor 6 and the low turbine 10 powers the fan 4. Surrounding and extending within combustor section 8 is the fuel nozzle and manifold assembly 30 which is more particularly shown in FIG. 2. The fuel nozzle and manifold assembly 30 comprises a first fuel manifold 22 and a second fuel manifold 24 which supply fuel to a first and second plurality of fuel nozzles 26 and 28 through a first and second plurality of fuel nozzle lines 32 and 34 respectively. Fuel is supplied to manifolds 22 and 24 by first and second fuel lines 40 and 42 respectively and the rate of flow to fuel lines 40 and 42 is controlled by the fuel control 44. FIG. 3 shows a shutoff valve 46 disposed along fuel line 40 and its operation is controlled by a digital electronic computer 42 which also controls the operation of fuel control 44. A first control line 52 and a second control line 54 which may be either electronic or electrical, connect the digital electronic computer 42 to the fuel control 44 and shutoff valve 46 respectively as shown in FIG. 1.

Figure 2:
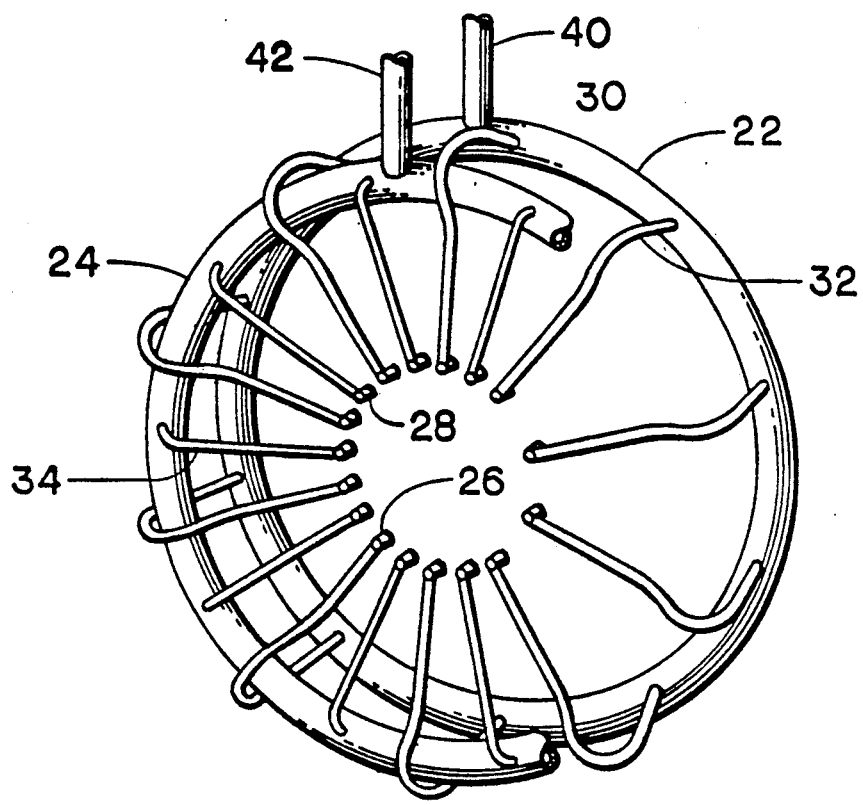
FIG. 2 is a perspective schematic view of the fuel nozzle and manifold assembly showing the relative positions of the fuel nozzles, manifolds, and supply lines in accordance with one embodiment of the present invention.
Figure 3:
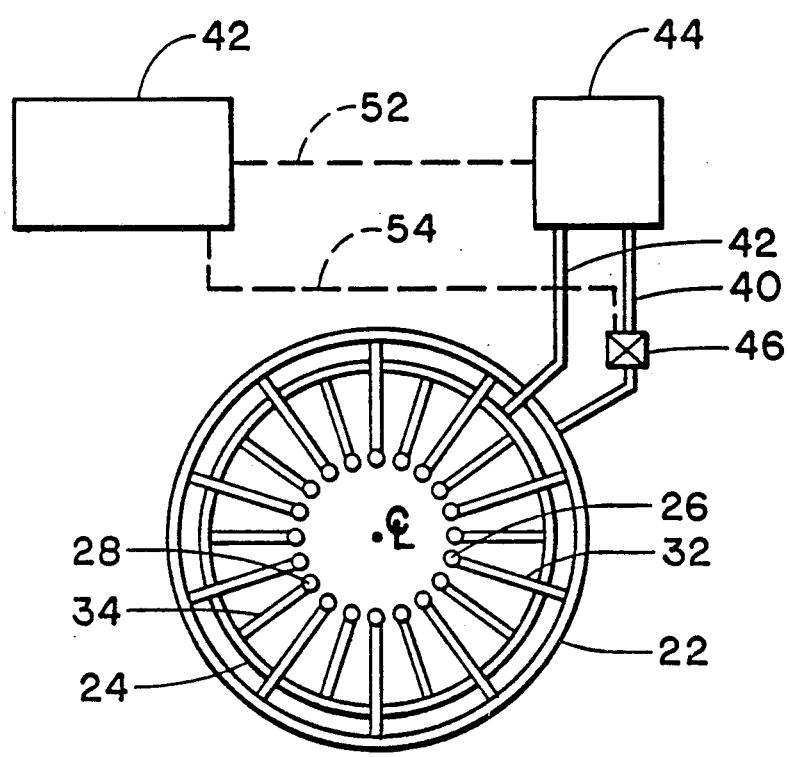
FIG. 3 is a diagrammatic sketch of the fuel injection system made in accordance with one embodiment of the present invention.

Referring now to FIG. 2, the fuel nozzle and manifold assembly 30 is depicted in order to show the general arrangement and relative positioning of some of the elements. We have found that ring-shaped or annular fuel manifolds are advantageous but the invention is not limited to this particular type of manifold cross section. The fuel nozzle and manifold assembly 30 comprises a first fuel manifold 22 which receives its fuel from the fuel control 44 (shown in FIG. 1) through a first fuel line 40. A first plurality of fuel nozzles 26 are supported and positioned in the combustor section 8 (shown in FIG. 1), and supplied with fuel from the first fuel manifold 22 by a first plurality of nozzle lines 32. A second fuel manifold 24 receives fuel from the fuel control 44 through a second fuel line 42 and supplies fuel to a second plurality of fuel nozzles 28 through a second plurality of nozzle lines 34. The second plurality of fuel nozzles 28 are supported and positioned in the combustor section 8 by the second plurality of nozzle lines 34. Nozzle lines 32 and 34 may be fuel pipes or structural members with fuel lines contained within as in the present invention.

FIG. 3 depicts the preferred embodiment in which the first plurality of fuel nozzles 26 are uniformly positioned in an alternating arrangement with the second plurality of fuel nozzles 28. In the preferred embodiment all the fuel nozzles 26 and 28 are positioned uniformally and circumferentially with respect to the engine centerline CL. However, the invention is not limited to this particular arrangement and may have arrangements in which every second or third fuel nozzle depends from the first manifold and the rest from the second manifold. We have found that twenty (20) is an advantageous total number of fuel nozzles wherein there are ten first fuel nozzles 26 connected to the first fuel manifold 22 and ten second fuel nozzles 28 connected to the second fuel manifold 24. This number allows for a even distribution of fuel and temperature in the combustor section 8 during engine operation employing only the second plurality of fuel nozzles 28 while keeping to a minimum the total number of fuel nozzles.

Referring again to FIG. 3, the invention operates as follows. The fuel nozzle and manifold assembly 30 supplies an atomized fuel and air mixture to the combustor 8 (shown in FIG. 1) in an efficient manner to promote complete combustion. Fuel is supplied to the fuel nozzle and manifold assembly 30 by the fuel control 44 through first and second fuel lines 40 and 42 respectively. The fuel control 44 meters out the amount of fuel to be burned in combustor section 8 in response to the pilots request or a predetermined schedule. The fuel control 44 is controlled by a digital electronic engine computer 42 through a first control line 52. A shutoff valve 46 is positioned in first fuel line 40 and is controlled by the digital electronic engine computer 42 through a second control line 54. The digital electronic computer monitors various aircraft, flight and engine parameters and calculates other engine parameters or operating conditions. Some of the measured or derived parameters are indicative of the engine's operating condition. Among these parameters are engine fuel flow and combustion air flow which are used to derive a third parameter, fuel to air ratio. Another signal sensed by the engine computer 42 is weight on wheel which indicates the aircraft is on the ground. The weight on wheel signal is used as an override signal to open the valve thereby allowing all twenty fuel nozzles 26 and 28 to operate. This helps to prevent the engine from violating FAA emission regulations relating to invisible engine exhaust emissions.

The first and second control lines 52 and 54 respectively are indicated by dashed line and may employ either electrical, electronic, or fiber optic connections. Modern aircraft gas turbine engines employ electronic engine controls and this element may also be part of a central aircraft control computer. The digital electronic engine control 42 is the means by which the fuel schedule is stored and the schedule's instructions are carried out.

During most operating conditions the shutoff valve 46 remains in the inactive mode which is open thereby allowing all fuel nozzles 26 and 28 to operate. When shutoff valve 46 is activated, flow to the first plurality of fuel nozzles 26 is shut off or interrupted. The valve is activated only during certain operating conditions or in response to a predetermined engine parameter signal. The preferred embodiment of the present invention incorporates the derived fuel-to-air ratio as the engine parameter signal. Other signals may be used which represent engine operating conditions as well as engine operating parameters. Another typical operating condition for which the shutoff valve 46 is activated is descent and in particular idle descent. This condition is signaled to the electronic engine control 42 by the power setting which on modern aircraft is a function of the power lever angle controlled by the pilot. The preferred embodiment uses the derived fuel to air ratio parameter. The value at which the shutoff valve is activated may be a variable or may be fixed as in the preferred embodiment. In order to prevent unduly high emission levels an overriding weight on wheel signal, indicative of the aircraft being on the ground, inactivates the shutoff valve allowing fuel to flow to all fuel nozzles even though one or more other signals indicate the shutoff valve should be activated.

It is to be understood that this invention is not limited to the particular embodiment disclosed, and it is intended to cover all modifications coming within the scope of this invention as claimed.

What we claim is:

1. A fuel injection system for use in the combustor section of a gas turbine engine said fuel injection system comprising:
   a plurality of generally downstream facing fuel nozzles wherein a portion of said fuel nozzles are connected to a shutoff valve means which is interruptible, a means for interrupting said valve means in response to a control signal, and
   a means for generating said control signal based on the gas turbine engine fuel to air ratio and an overriding weight on wheels signal.

2. A fuel injection system for use in the combustor section of a gas turbine engine said fuel injection system comprising:
   first and second fuel lines,
   first and second pluralities of generally downstream facing fuel nozzles in fluid supply communication with said first and second fuel lines respectively,
   a shutoff valve interposed in said first fuel line, a means for shutting on and off said valve in response to a control signal; and a means for generating said control signal based upon the gas turbine engine fuel to air ratio and an overriding weight on wheels signal.

3. A fuel injection system as set forth in claim 2 comprising: first and second fuel manifolds disposed between said first and second fuel lines and said first and second pluralities of fuel nozzles respectively.

4. A fuel injection system as set forth in claim 3 wherein: said first and second pluralities of fuel nozzles are arranged in a generally circular and alternating pattern.

5. A fuel injection system as set forth in claim 4 including:
a fuel control in supply communication with said first and second fuel lines.

6. A fuel injection system as set forth in claim 5 wherein said means for generating said control signal is an electronic engine control which controls said shutoff valve and said fuel control.

7. A fuel injection system as set forth in claim 6 wherein:
said electronic engine control is a digital electronic engine control.

* * * * *